US007539483B2

(12) United States Patent
Shi et al.

(10) Patent No.: US 7,539,483 B2
(45) Date of Patent: May 26, 2009

(54) SYSTEM AND METHOD FOR ENTERING ALPHANUMERIC CHARACTERS IN A WIRELESS COMMUNICATION DEVICE

(75) Inventors: Guangming Shi, San Diego, CA (US); Tomasz Johannsen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 09/847,474

(22) Filed: May 2, 2001

(65) Prior Publication Data

US 2002/0165011 A1 Nov. 7, 2002

(51) Int. Cl.
*H04M 3/42* (2006.01)
(52) U.S. Cl. .................... 455/414.1; 455/415; 455/459; 455/563; 379/67; 379/88
(58) Field of Classification Search ................ 455/414, 455/415, 459, 563; 379/67, 88, 88.19, 88.2, 379/88.21, 88.22, 88.23
See application file for complete search history.

(56) References Cited

U.S. PATENT DOCUMENTS

| 5,335,313 | A | * | 8/1994 | Douglas | 704/275 |
| 5,805,298 | A | * | 9/1998 | Ho et al. | 358/402 |
| 5,838,458 | A | * | 11/1998 | Tsai | 358/402 |
| 6,061,654 | A | * | 5/2000 | Brown et al. | 704/275 |
| 6,215,992 | B1 | * | 4/2001 | Howell et al. | 455/412.1 |
| 6,226,361 | B1 | * | 5/2001 | Koyama | 379/88.07 |
| 6,263,202 | B1 | * | 7/2001 | Kato et al. | 455/418 |
| 6,400,805 | B1 | * | 6/2002 | Brown et al. | 379/88.01 |
| 6,622,017 | B1 | * | 9/2003 | Hoffman | 455/419 |
| 6,665,547 | B1 | * | 12/2003 | Ehara | 455/563 |
| 6,687,673 | B2 | * | 2/2004 | Mann | 704/244 |
| 6,792,082 | B1 | * | 9/2004 | Levine | 379/67.1 |
| 2002/0107049 | A1 | * | 8/2002 | Maquaire et al. | 455/563 |

* cited by examiner

*Primary Examiner*—Matthew D Anderson
*Assistant Examiner*—Minh D Dao

(57) ABSTRACT

A wireless communications device (100) may include an audio-input device (118), a memory (104), a voice-recognition engine (122) and various features which may make use of alphanumeric characters, such as the ability to send electronic messages and to store address information and the like. In one embodiment, the audio-input device (118) receives audio-data and the voice-recognition engine (122) is configured to interpret the audio-data as matching a selected one of a set of alphanumeric characters. The selected alphanumeric character is stored in the memory (104) for subsequent use in the operation of the wireless communications device (100).

44 Claims, 3 Drawing Sheets

SYSTEM 100

SYSTEM AND METHOD FOR ENTERING ALPHANUMERIC CHARACTERS IN A WIRELESS COMMUNICATION DEVICE

FIELD OF THE INVENTION

The present invention is directed generally to a wireless communication device, and, more particularly, to a system and method for entering alphanumeric characters in a wireless communication device.

BACKGROUND OF THE INVENTION

Wireless communications devices, such as cellular telephones, typically include a housing, a keypad, a display, and an audio-input device, such as a microphone. In addition, many wireless communications devices can be configured to send messages, to receive commands, to place calls and to store information, such as names and associated addresses.

A wireless communications device user will frequently desire to input alphanumeric characters, such as the letters of the alphabet, numbers, and other special characters, such as '!', '@', '#', '$', '%', and so forth, for use in conjunction with the operation of the wireless communications device. The user may desire, for example, to input alphanumeric characters for use in connection with sending messages, receiving commands, placing calls, storing information, and the like. To enter alphanumeric characters, the user must use the limited number of keys on the keypad to represent each of the alphanumeric characters. This will frequently require the user to enter several key strokes for each alphanumeric character. It is inconvenient for the user to enter multiple keystrokes for each alphanumeric character to be input. Therefore, it can be appreciated that there is a significant need for a system to enter alphanumeric characters in a wireless communications device without the need to enter one or more keystrokes for each character.

SUMMARY OF THE INVENTION

The present invention is embodied in a system and method for audio-entry of alphanumeric characters for use in conjunction with the operation of a wireless communications device. In one embodiment the system includes a housing, a keypad, an audio-input device, a memory, a transmitter and a receiver. The system also includes a voice-recognition engine. The voice-recognition engine can be configured to match audio-data received by the audio-input device with a selected one of a set of alphanumeric characters. The alphanumeric characters can then be used in conjunction with the operation of the wireless communications device.

DETAILED DESCRIPTION OF THE PREFERRED EMBODIMENTS

The present invention provides for audio entry of alphanumeric characters in a wireless communications device, and, as a result, reduces user key strokes required for entry of alphanumeric characters in a wireless communications device. The present invention may be readily implemented in any wireless communications device. Although the examples herein refer to a cellular phone, the principles of the present invention are applicable to any wireless communications device, including, but not limited to, analog and digital cellular telephones, personal communications system (PCS) devices, and the like.

Figure 1:
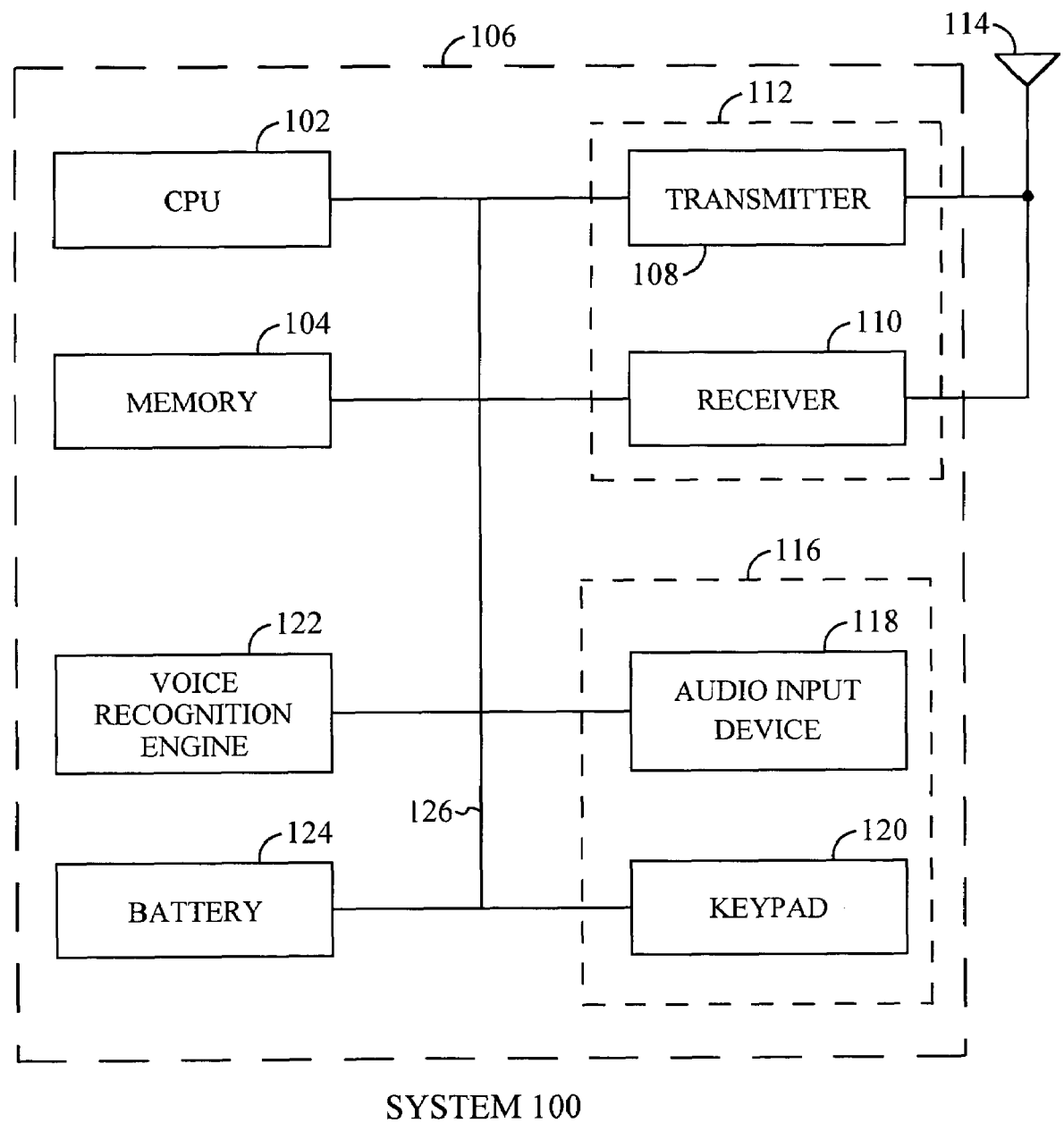
FIG. 1 is a functional block diagram of a wireless communication device implementing the present invention.

The present invention is embodied in a system 100 illustrated in the functional block of FIG. 1. The system 100 includes a central processing unit (CPU) 102, which controls operation of the system. A memory 104, which may include both read-only memory (ROM) and random-access memories (RAM), provides instructions and data to the CPU 102. A portion of the memory 104 may also contain non-volatile random-access memory.

Figure 2:
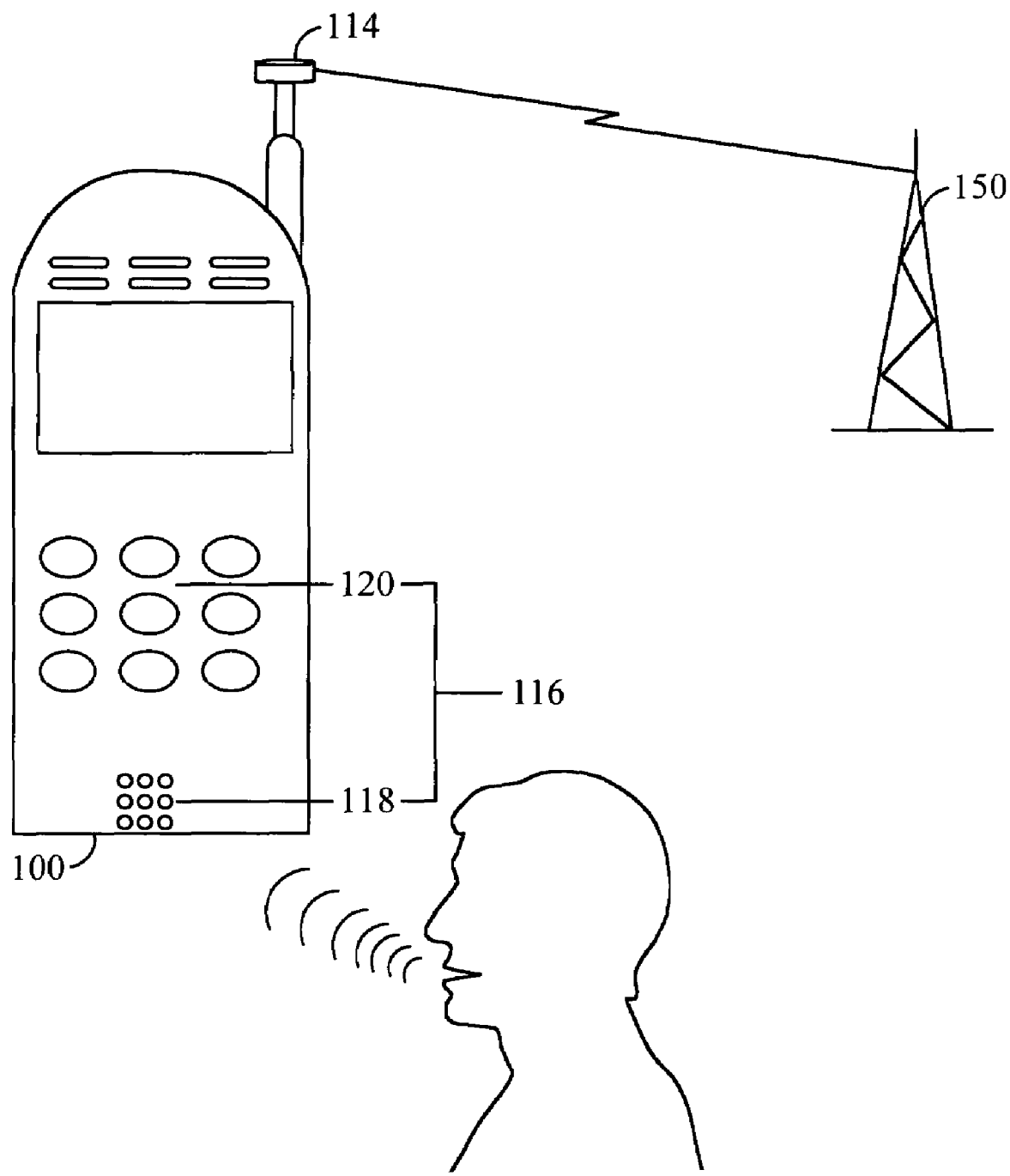
FIG. 2 illustrates the operation of FIG. 1 using audio-data to transmit alphanumeric characters to a remote location.

The system 100, which is typically embodied in a wireless communication device such as a cellular telephone, also includes a housing 106 that contains a transmitter 108 and a receiver 110 to allow transmission and reception of data, such as audio communications and programming data, between the system 100 and a remote location, such as a base transceiver station (BTS) 150 (see FIG. 2). The transmitter 108 and the receiver 110 may be combined into a transceiver 112. An antenna 114 is attached to the housing 106 and electrically coupled to the transceiver 112. The operation of the transmitter 108, receiver 110, and antenna 114 is well-known in the art and need not be described herein. Although FIG. 1 illustrates the antenna 114 as extending from the housing 106, some designs may include an internal antenna that is contained completely within the housing. The transmitter 108, the receiver 110, and the antenna 114, however, operate in a conventional manner regardless of the location of the antenna.

A user-input device 116, comprising at least an audio-input device 118 is attached to the housing 106 for operation by the user in a conventional manner. The user-input device 116 provides a convenient means by which alphanumeric characters, commands, and other data may be entered by the user. Although FIG. 1 illustrates the user-input device 116 as comprising an audio-input device 118 and a keypad 120, other user-input devices may be used, including a data input jack (not shown), and the like, and in various combinations. In addition, while the audio-input device 118 may be a microphone (see FIG. 2), one skilled in the art will recognize that other audio-input devices 118 may be used, including an audio-data input jack (not shown), the receiver 110, and the like, and in various combinations.

The system 100 also includes a voice-recognition engine 122 providing digital signal processing utilizing appropriate voice-recognition software, conventionally implemented using a dedicated digital signal processor (DSP), not shown.. As will be discussed in greater detail below, system 100 may use the voice-recognition engine to match audio-data to alphanumeric characters, commands, identifiers, and the like. Voice-recognition engines rely on the ability to correlate user-entered audio-data to words within a previously trained vocabulary set. When the correlation between the user-entered word and a word in the vocabulary set exceeds a predetermined threshold, that word is selected as an appropriate match. One of ordinary skill in the art will be able to determine the details of training the vocabulary set and matching audio-data with a previously trained vocabulary set. Thus, the training of the vocabulary set and the operation of the voice-recognition engine 122 need not be discussed in detail herein. One skilled in the art will recognize that the voice-recognition engine may be configured to analyze and interpret audio-data by the user or may be preset to do so at the factory, or some combination thereof.

The use of a limited set of alphanumeric characters (e.g., 0-9, a-z, A-Z, and a few special characters) permits the voice-recognition engine 122 to function satisfactorily with a limited vocabulary set. The limited vocabulary set results in the use of fewer system resources, faster training time, and a faster response time from the voice-recognition engine 122. One skilled in the art will recognize that the limited vocabulary set may also include commands, address identifiers (such as names for use with an address book) and the like.

The voice-recognition engine 122 may be readily implemented as a series of software instructions placed in the memory 104 and executed by a DSP and/or the CPU 102. Thus, minor software modifications to existing hardware will allow the implementation of the system 100.

Electrical components of the system 100 receive power from a battery 124, which is attached to and supported by the housing 106. In an exemplary embodiment, the battery 124 is a rechargeable battery. In other embodiments, the system 100 may include a connector (not shown) for the connection of an external power source, such as an automobile power adapter, AC power adapter, or the like.

The various components of the system 100 are coupled together by a bus system 126 which may include a power bus, control bus, and status signal bus in addition to a data bus. For the sake of clarity, however, the various buses are illustrated in FIG. 1 as the bus system 126.

One skilled in the art will recognize that a wireless communication device may use voice-entered alphanumeric characters in conjunction with the operation of the device in different ways. For the sake of brevity, the system 100 will be described using a limited number of examples.

In one embodiment, the system 100 may be configured to interpret audio-data as matching a selected one of a set of alphanumeric characters and to store the selected character for subsequent use in the operation of the system 100. In this embodiment, the voice-recognition engine 122 is configured to interpret audio-data as matching a selected one of a set of alphanumeric characters.

The user provides audio-data to the audio-input device 118. For example, the user may say "Capital X" to the audio-input device 118. The voice-recognition engine 122 receives the audio-data from the audio-input device 118, in this example audio-data corresponding to "Capital X". The voice-recognition engine 122 interprets the audio-data as matching a selected one of a set of alphanumeric characters, in this example the alphanumeric character "X". The selected alphanumeric character is stored in the memory 104, in this example the alphanumeric character "X", and is available for subsequent use in the operation of the system 100. For example, the transmitter 108 may transmit the stored alphanumeric character to a remote location, such as the BTS 150. FIG. 2 illustrates the operation of the system 100 to transmit voice-entered alphanumeric characters to a remote location, such as a BTS 150.

In another embodiment, the system 100 is also configured to interpret audio-data as matching a selected one of a set of commands and to execute the selected command. In this embodiment, the voice-recognition engine 122 is configured to also match audio-data to a select one of a set of commands. The user provides audio-data to the audio-input device 118. The voice-recognition engine 122 receives the audio-data from the audio-input device 118. The voice-recognition engine 122 interprets the audio-data as matching a selected one of a set of commands. The selected command is executed by the CPU 102. For example, the user may provide the audio-input device 118 with audio-data corresponding to the "Send" command. The voice-recognition engine 122 will interpret the audio-data as matching the "Send" command and the CPU 102 will execute the "Send" command.

In another embodiment, the system 100 may also be configured to store a plurality of selected alphanumeric characters as part of an electronic message to transmit to a remote location. In this embodiment, the voice-recognition engine 122 is configured to interpret audio-data as matching a selected one of a set of alphanumeric characters. The user provides audio-data to the audio-input device 118. The voice-recognition engine 122 receives the audio-data from the audio-input device 118 and interprets the audio-data as matching a selected one of a set of alphanumeric characters. A plurality of selected alphanumeric characters are stored in the memory 104 as part of an electronic message. The transmitter 108 transmits the electronic message to a remote location, such as the BTS 150 (see FIG. 2). One skilled in the art will recognize that the electronic message may contain other data, such as a header or additional alphanumeric characters, and the like.

In another embodiment, the system 100 also will be configured to match audio-data to a selected one of a set of commands, as described above, to process the electronic message. In this embodiment, for example, the user may provide the following audio-data to the audio-input device 118: "Capital H", "I", "Exclamation Point", and "Send". The voice-recognition engine 122 receives the audio-data from the audio-input device 118 and interprets the audio-data as matching the alphanumeric characters "H", "i", "!", and the command "send". The alphanumeric characters "H", "i", "!" are stored in the memory 104 as part of an electronic message. The CPU 102 executes the "Send" command and the transmitter 108 transmits the electronic message to a remote location, such as the BTS 150 (see FIG. 2). One skilled in the art will recognize that the electronic message may be compatible with various electronic message formats and protocols, such as a short-messaging-service protocol and the like.

In another embodiment, the system 100 may also be configured to associate a plurality of selected alphanumeric characters with an address-identifier, and to store the plurality of selected alphanumeric characters and the associated address-identifier. In this embodiment, the voice-recognition engine 122 is configured to interpret audio-data as matching a selected one of a set of alphanumeric characters. The user provides audio-data to the audio-input device 118. The voice-recognition engine 122 receives the audio-data from the audio-input device 118 and interprets the audio-data as matching a selected one of a set of alphanumeric characters. A plurality of selected alphanumeric characters are associated with an address-identifier by the CPU 102. One skilled in the art will also recognize that the plurality of alphanumeric characters may represent at least part of a destination telephone number, an electronic address, a street address, or the like. A typical wireless communication device allocates a portion of the memory 104 to serve the function of an electronic phone book. The plurality of selected alphanumeric characters and the associated address-identifier are stored in the memory 104 for subsequent use. One skilled in the art will recognize that the address-identifier may be associated with other data, such as a header or additional alphanumeric characters, and the like.

In an exemplary embodiment, the system 100 also will be configured to interpret the audio-data as matching a selected one of a set of commands, as described above, to process the plurality of selected alphanumeric characters and the associated address-identifier, and to interpret the audio-data as the address-identifier. In this embodiment, for example, the user may provide the following audio-data to the audio-input device 118: "Name", "John Doe", "Number", "5", "5", "5", "1", "2", "1", "2", and "Store". The voice-recognition engine 122 receives the audio-data from the audio-input device 118 and interprets the audio-data as: matching the command "Name"; containing the address identifier "John Doe"; matching the command "Number"; matching the alphanumeric characters "5", "5", "5", "1", "2", "1", "2"; and as matching the command "Store".

In this example, the CPU 102 executes the "Name" command by configuring the voice-recognition engine 122 to interpret subsequent audio-data as the address-identifier. The CPU 102 executes the "Number" command by configuring the voice-recognition engine 122 to interpret subsequent audio-data as matching a selected one of a set of alphanumeric characters. The CPU 102 associates the alphanumeric characters "5", "5", "5", "1", "2", "1", "2" with the address-identifier "John Doe" and executes the "Store" command by storing the alphanumeric characters "5", "5", "5", "1", "2", "1", "2" and the associated address-identifier "John Doe" in the memory 104.

Those skilled in the art will recognize that the voice-recognition engine 122 may be configured to properly interpret the audio-data as a command, an alphanumeric character, an address identifier, or other information through other means. For example, the system 100 may be configured to interpret the audio-data as either a command, an alphanumeric character, an address identifier, or other information based upon the position of the audio-data in the data stream. Alternatively, the user may use the keypad 120 to enter commands which tell the system 100 to interpret the audio-data properly. The system 100 might also use a sequencing scheme. For example, the voice-recognition engine 122 may be configured to attempt a command match first. If there is no match, the voice-recognition engine 122 may be configured to then attempt to match the audio-data to a selected alphanumeric character, and so forth.

Those skilled in the art will also recognize that the audio-data, selected alphanumeric characters, uses of the audio-data, selected commands, electronic messages and address-identifiers used above are illustrative only and that the present invention is not limited to the specific audio-data, selected alphanumeric characters, uses of the audio-data, selected commands, electronic messages or address-identifiers mentioned.

Figure 3:
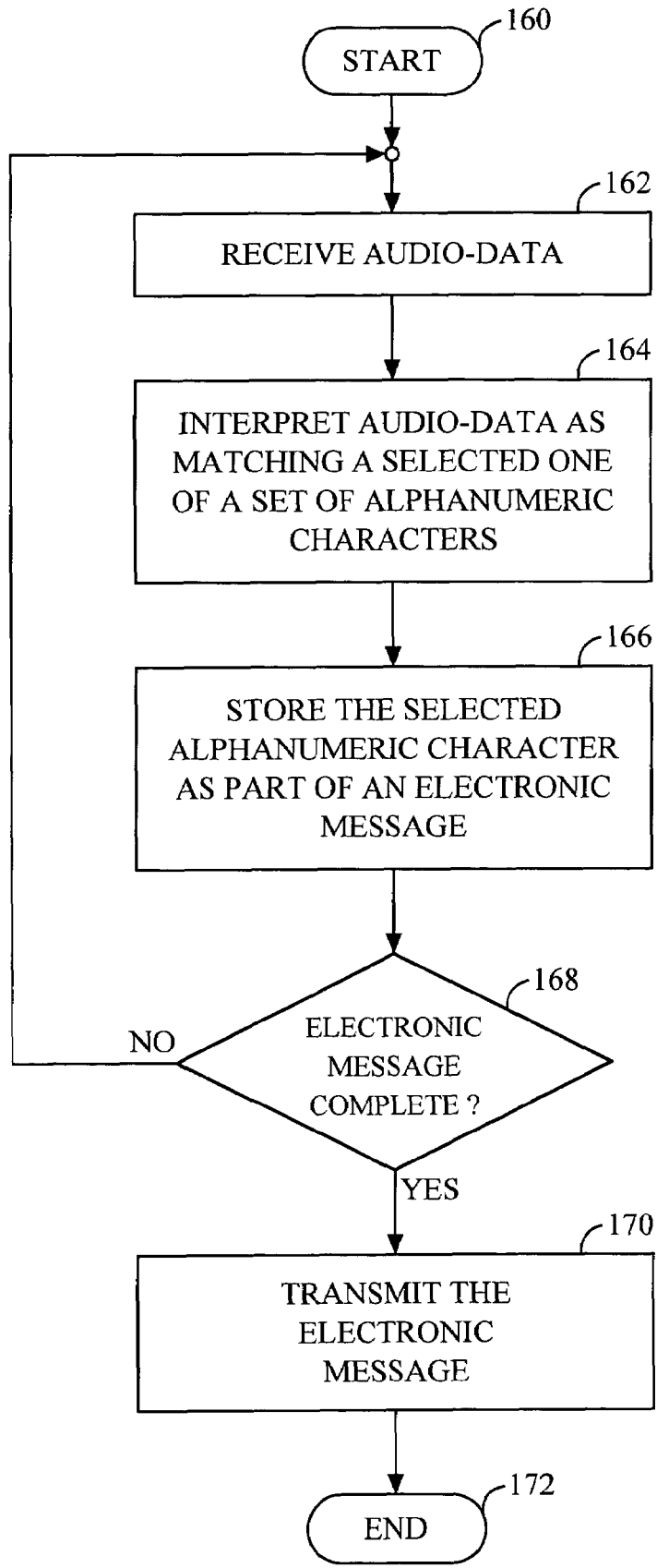
FIG. 3 is a flowchart illustrating the operation of the system of FIG. 1 to transmit to a remote location an electronic message composed at least in part of alphanumeric characters.

The operation of the system 100 to transmit to a remote location an electronic message composed at least in part of alphanumeric characters received by a wireless communications device via an audio-input device 118 is illustrated in FIG. 3. At a start 160, the wireless communication device is under power. At step 162 the system receives audio-data from the audio-input device 118. At step 164 the voice recognition engine 122 interprets the audio-data as matching a selected one of a set of alphanumeric characters. At step 166 the system 100 stores the selected alphanumeric character as part of an electronic message. At decision 168 the system determines whether the electronic message is complete. For example, the voice-recognition engine 122 may interpret the audio-data as a command, such as "Send", that indicates an end to the electronic message. One skilled in the art will recognize that the system 100 may determine that the electronic message is complete through other means, such as a time-out routine or user-entry of a "Send" command through the keypad 120.

If the electronic message is not complete, the result of decision 168 is NO. In that event, the system 100 returns to step 162 to receive additional audio-data.

If the electronic message is complete, the result of decision 168 is YES. In that event, the system 100 transmits the electronic message in step 170. The system ends the operation in step 172. Those skilled in the art will recognize that additional steps, such as error-checking routines and, as discussed above, audio-entry of commands to process the electronic message, and the like, may be performed. For the sake of brevity, those flowcharts will not be repeated herein. However, those of ordinary skill in the art may readily implement such processes based on the present disclosure.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

The invention claimed is:

1. A system for data entry in a wireless communication device, the system comprising:
    an audio-input device to receive audio-data;
    a voice-recognition engine to receive and analyze the audio-data, wherein the voice-recognition engine is configured to interpret single word or multiple word audio-data as matching any one of a set of alphanumeric characters to use in conjunction with the operation of the wireless communication device and to further interpret the single word or multiple word audio-data as matching any one of a set of commands, the set of commands comprising at least one command for configuring the voice-recognition engine in interpreting the audio-data, and wherein the voice-recognition engine is configured to use a sequencing scheme to attempt to match the audio-data to one of the set of commands first, and if there is no match, attempt to match the audio-data to one of the set of alphanumeric characters;
    a memory to store a selected alphanumeric character for subsequent use in conjunction with the operation of the wireless communication device; and
    a processor to execute a selected command.

2. The system of claim 1, further comprising a transmitter to transmit the selected alphanumeric character to a remote location.

3. The system of claim 1 wherein the memory stores a plurality of selected alphanumeric characters, the plurality of selected alphanumeric characters comprising at least a portion of an electronic message, the system further comprising
    a transmitter to transmit the electronic message to a remote location.

4. The system of claim 3 wherein the electronic message is compatible with a short-messaging-service protocol.

5. The system of claim 3 wherein the voice-recognition engine is further configured to interpret the single word or multiple word audio-data as matching a command to process the electronic message.

6. The system of claim 1 wherein the single word or multiple word audio-data matches a selected one of the group of special characters consisting of !, @, #, $, or %.

7. The system of claim 1 wherein the single word or multiple word audio-data matches special character @.

8. A system for storing address information in a wireless communication device, the system comprising:
    an audio-input device to receive audio-data;

a voice-recognition engine to receive and analyze the audio-data, wherein the voice-recognition engine is configured to interpret single word or multiple word audio-data as matching any one of a set of alphanumeric characters, and wherein the voice-recognition engine is configured to use a sequencing scheme to attempt to match the audio-data to one of a set of commands first and if there is no match, attempt to match the audio-data to one of the set of alphanumeric characters;

a processor to associate an address-identifier in an electronic phone book with a plurality of selected alphanumeric characters; and a memory to store the plurality of selected alphanumeric characters in association with the associated address-identifier in the electronic phone book for subsequent use in conjunction with the operation of the wireless communication device, wherein the voice-recognition engine is further configured to interpret the single word or multiple word audio-data as matching a selected one of the set of commands to process the plurality of selected alphanumeric characters and the associated address-identifier to interpret the audio-data as the address-identifier, the processor executing the selected command.

9. The system of claim 8 wherein the plurality of selected alphanumeric characters associated with the address-identifier represents at least part of a destination telephone number.

10. The system of claim 8 wherein the plurality of selected alphanumeric characters associated with the address-identifier represents at least part of an electronic address.

11. The system of claim 8 wherein the plurality of selected alphanumeric characters associated with the address-identifier represents at least part of a street address.

12. The system of claim 8 wherein the voice-recognition engine is further configured to interpret the single word or multiple word audio-data as the address-identifier.

13. A method for data entry in a wireless communication device, the method comprising:
receiving audio-data;
configuring the wireless commmunication device to interpret single word or multiple word audio-data as matching any one of a set of alphanumeric characters to use in conjunction with the operation of the wireless communication device;
storing the a selected alphanumeric character for subsequent use in conjunction with the operation of the wireless communication device;
configuring the wireless communication device to interpret the single word or multiple word audio-data as matching any one of a set of commands, the set of commands comprising at least one command for configuring the wireless communication device in interpreting the audio-data;
using a sequencing scheme to attempt to match the audio-data to one of the set of commands first and if there is no match, attempt to match the audio-data to one of the set of alphanumeric characters; and executing a selected command.

14. The method of claim 13, further comprising transmitting the selected alphanumeric character to a remote location.

15. The method of claim 13, further comprising
storing a plurality of selected alphanumeric characters, the plurality of selected alphanumeric characters comprising at least a portion of an electronic message, and transmitting the electronic message to a remote location.

16. The method of claim 15 wherein the message is compatible with a short-messaging-service protocol.

17. The method of claim 15, further comprising
configuring the wireless communications device to interpret the single word or multiple word audio-data as matching a command to process the electronic message.

18. The method of claim 13 wherein the single word or multiple word audio-data matches a selected one of the group of special characters consisting of !, @, #, $, or %.

19. The method of claim 13 wherein the single word or multiple word audio-data matches special character @.

20. A method for storing address information in a wireless communication device, the method comprising:
receiving audio-data;
configuring the wireless communications device to interpret single word or multiple word audio-data as matching any one of a set of alphanumeric characters;
associating a plurality of selected alphanumeric characters with an address-identifier in an electronic phone book;
storing the plurality of selected alphanumeric characters in association with the associated address-identifier in the electronic phone book for subsequent use in conjunction with the operation of the wireless communication device;
configuring the wireless communication device to interpret the single word or multiple word audio-data as matching any one of a set of commands to process the plurality of selected characters and the associated address-identifier to interpret the audio-data as the address-identifier;
using a sequencing scheme to attempt to match the audio-data to one of the set of commands first, and if there is no match, attempt to match the audio-data to one of the set of alphanumeric characters and
executing a selected command.

21. The method of claim 20 wherein the plurality of selected characters associated with the address-identifier represents at least part of a destination telephone number.

22. The method of claim 20 wherein the plurality of selected characters associated with the address-identifier represents at least part of an electronic address.

23. The method of claim 20 wherein the plurality of selected characters associated with the address-identifier represents at least part of a street address.

24. The method of claim 20, further comprising
configuring the wireless communication device to interpret the single word or multiple word audio-data as the address-identifier.

25. The method of claim 20 wherein the single word or multiple word audio-data matches a selected one of the group of special characters consisting of !, @, #, $, or %.

26. The method of claim 20 wherein the single word or multiple word audio-data matches special character @.

27. A system for data entry in a wireless communication device, the system comprising:
an audio-input device to receive audio-data;
a voice-recognition engine to receive and analyze the audio-data, wherein the voice-recognition engine is configured to interpret single word or multiple word audio-data as matching any one of a set of alphanumeric characters to use in conjunction with the operation of the wireless communication device and to further interpret the single word or multiple word audio-data, as matching any one of a set of commands, the set of commands comprising at least one, command for configuring the voice-recognition engine in interpreting the audio-data, wherein the multiple word audio-data is in the form of "Capital X," wherein "X" represents one of the group of alphabetical letters from A to Z, and wherein the voice-recognition engine is further configured to use a sequencing scheme to attempt to match the audio-data to one of the set of commands first, and if there is no match, attempt to match the audio-data to one of the set of alphanumeric characters;

a memory to store the a selected alphanumeric character for subsequent use in conjunction with the operation of the wireless communication device; and a processor to execute a selected command.

28. A method for data entry in a wireless communication device, the method comprising:

receiving audio-data;

configuring the wireless communication device to interpret single word or multiple word audio-data as matching any one of a set of alphanumeric characters to use in conjunction with the operation of the wireless communication device, wherein the multiple word audio-data is in the form of "Capital X," wherein "X" represents one of the group of alphabetical letters from A to Z;

storing a selected alphanumeric character for subsequent use in conjunction with the operation of the wireless communication device;

configuring the wireless communication device to interpret the single word or multiple word audio-data as matching any one of a set of commands, the set of commands comprising at least one, command for configuring the wireless communication device in interpreting the audio-data;

using a sequencing scheme to attempt to match the audio-data to one of the set of commands first, and if there is no match attempt to match the audio-data to one of the set of alphanumeric characters; and executing a selected command.

29. A method for storing address information in a wireless communication device, the method comprising:

receiving audio-data;

configuring the wireless communications device to interpret single word or multiple word audio-data as matching any one of a set of alphanumeric characters, wherein the multiple word audio-data is in the form of "Capital X," wherein "X" represents one of the group of alphabetical letters from A to Z;

associating a plurality of selected alphanumeric characters with an address-identifier in an electronic phone book;

storing the plurality of selected alphanumeric characters in association with the associated address-identifier in the electronic phone book for subsequent use in conjunction with the operation of the wireless communication device;

configuring the wireless communication device to interpret the single word or multiple word audio-data as matching any one of a set of commands to process the plurality of selected characters and the associated address-identifier;

using a sequencing scheme to attempt to match the audio-data to one of the set of commands first, and if there is no match, attempt to match the audio-data to one of the set of alphanumeric characters; and executing a, selected command.

30. A wireless communication device comprising:

an audio-input, device to receive audio-data;

a voice-recognition engine to receive and analyze the audio-data, wherein the voice-recognition engine is configured to interpret single word or multiple word audio-data as matching any one of a set of alphanumeric characters to use in conjunction with the operation of the wireless communication device, and wherein the voice-recognition engine is further configured to use a sequencing scheme to attempt to match the audio-data to one of a set of commands first, and if there is no match, attempt to match the audio-data to one of the set of alphanumeric characters;

a memory to store the a selected alphanumeric character for subsequent use in conjunction with the operation of the wireless communication device; and a processor to execute the storage of the selected alphanumeric character.

31. The device of claim 30, further comprising a transmitter to transmit the selected alphanumeric character to a remote location.

32. The device of claim 30 wherein the memory stores a plurality of selected alphanumeric characters, the plurality of selected alphanumeric characters comprising at least a portion of an electronic message, the system further comprising a transmitter to transmit the electronic message to a remote location.

33. The device of claim 32 wherein the electronic message is compatible with a short-messaging-service protocol.

34. The device of claim 30 wherein the single word or multiple word audio-data matches a selected one of the group of special characters consisting of !, @, #, $,or %.

35. The device of claim 30 wherein the single word or multiple word audio-data matches special character, @.

36. The device of claim 30, further comprising:

a keypad for manual data entry, wherein each key of said keypad corresponds to a plurality of alphanumeric characters.

37. A wireless communication device comprising:

an audio-input device to receive audio-data;

a voice-recognition engine to receive and analyze the audio-data, wherein the voice-recognition engine is configured to interpret single word or multiple word audio-data as matching any one of a set of alphanumeric characters to use in conjunction with the operation of the wireless communication device, wherein the multiple word audio-data is in the form of "Capital X," wherein "X" represents one of the group of alphabetical letters from A to Z, and wherein the voice-recognition engine is configured to use a sequencing scheme to attempt to match the audio-data to one of a set of commands first, and if there is no match, attempt to match the audio-data to one of the set of alphanumeric characters;

a memory to store a selected alphanumeric character for subsequent use in conjunction with the operation of the wireless communication device; and a processor to execute the storage of the selected alphanumeric character.

38. A method for communicating with a wireless communication device, comprising:

receiving audio data;

analyzing the audio-data to interpret single word or multiple word audio-data as matching any one of a set of alphanumeric characters to use in conjunction with the operation of the wireless communication device;

storing a selected alphanumeric character for use in conjunction with the operation of the wireless communication device; and using a sequencing scheme to attempt to match the audio-data to one of a set of commands first, and if there is no match, attempt to match the audio-data to one of the set of alphanumeric characters.

39. The method of claim 38, further comprising: transmitting the selected alphanumeric character to a remote location.

40. The method of claim 39 wherein said transmitting is compatible with a short-messaging-service protocol.

41. The method of claim 38 wherein the single word or multiple word audio-data matches a selected one of the group of special characters consisting of !, @, #, $,or%.

42. The method of claim 38 wherein the single word or multiple word audio-data matches special character @.

43. A method for communicating with a wireless communication device, comprising:
   receiving audio data;
   analyzing the audio-data to interpret single word or multiple word audio-data as matching any one of a set of alphanumeric characters to use in conjunction with the operation of the wireless communication device, wherein the multiple word audio-data is in the form of "Capital X," wherein "X" represents one of the group of alphabetical letters from A to Z;
   using a sequencing scheme to attempt to match the audio-data to one of a set of commands first, and if there is no match, attempt to match the audio-data to one of the set of alphanumeric characters; and
   storing a selected alphanumeric character for use in conjunction with the operation of the wireless communication device.

44. A wireless communication device comprising:
   means for receiving audio-data;
   means for configuring the wireless communication device to interpret single word or multiple word audio-data as matching any one of a set of alphanumeric characters to use in conjunction with the operation of the wireless communication device;
   means for storing the a selected alphanumeric character for subsequent use in conjunction with the operation of the wireless communication device;
   means for configuring the wireless communication device to interpret the single word or multiple word audio-data as matching any one of a set of commands, the set of commands comprising at least one command for configuring the wireless communication device in interpreting the audio-data; and
   means for using a sequencing scheme to attempt to match the audio-data to one of the set of commands first, and if there is no match, attempt to match the audio-data to one of the set of alphanumeric characters.

* * * * *